United States Patent Office 2,823,226
Patented Feb. 11, 1958

2,823,226

PREPARATION OF MALONDIALDEHYDE DERIVATIVES

Tadashi Tsukamoto, Tetsuya Suzuki, Kazuo Heijo, Saburo Takebe, Goichi Sudo, and Yusuke Tanaka, Yahata-shi, Fukuoka-ken, Japan, assignors to Mitsubishi Kasei Kogyo Kabushiki Kaisha, Tokyo, Japan, a corporation of Japan No Drawing. Application August 16, 1954
Serial No. 450,272

Claims priority, application Japan August 28, 1953

6 Claims. (Cl. 260—488)

This invention relates to malondialdehyde derivatives and the method for preparing the same. More especially, the invention is concerned with the preparing method of malondialdehyde derivatives from vinyl acetate and esters of orthoformic acid.

It is known to prepare 1.1.3.3-tetraalkoxypropane by reacting vinyl esters with esters of orthoformic acid in the presence of an acid reacting halide catalyst (U. S. Pat. 2,459,076). Such acid reacting halide catalysts include ferric chloride, aluminium chloride, iodine, mercuric chloride, boron trifluoride, zinc chloride and stannous chloride. In order to obtain a good yield of 1.1.3.3-tetraalkoxypropane, it is necessary to use 2 or more stoichiometrical equivalents of esters of orthoformic acid to vinyl esters, for example vinyl acetate. Namely, vinyl acetate reacts with esters of orthoformic acid in the presence of the above mentioned catalysts, as in the following formula:

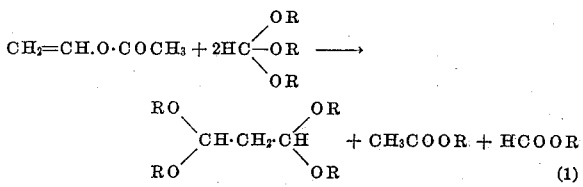

in which R is alkyl radical.

In the same manner as the addition reaction of equimols of vinyl ether and esters of orthoformic acid produces 1.1.3.3-tetraalkoxypropane, we supposed that it might be possible to produce the skeleton of malondialdehyde, —CH·CH$_2$·CH—, in the equimol reaction of vinyl acetate with esters of orthoformic acid, and that 1.1.3-trialkoxy-3-acetoxypropane should be produced by the following formula:

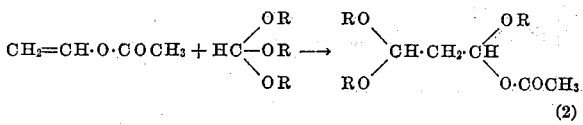

in which R is alkyl radical.

We studied carefully the reaction of vinyl acetate with esters of orthoformic acid by using the catalysts described in the above U. S. Patent 2,459,076. However, contrary to our expectation, we could not recognize the formation of 1.1.3-trialkoxy-3-acetoxypropane, and we obtained solely 1.1.3.3-tetraalkoxypropane. This fact induced us to suppose that 1.1.3-trialkoxy-3-acetoxypropane formed by the above Formula 2 forms 1.1.3.3-tetraalkoxypropane by reacting with esters of orthoformic acid as in the Formula 3 shown hereunder, that the reaction of the Formula 3 is so rapid in the presence of catalysts above-mentioned, that 1.1.3-trialkoxy-3-acetoxypropane formed by the Formula 2 is transformed immediately into 1.1.3.3-tetraalkoxypropane as in the Formula 3, and consequently, that the reaction can be shown by the Formula 1.

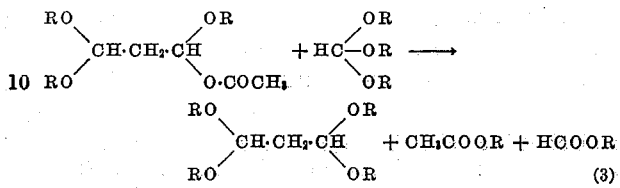

in which R is alkyl radical.

We found out also that an excess of esters of orthoformic acid in the ratio considerably larger than 2 mols per mol of vinyl acetate should be used in order to have a better yield of 1.1.3.3-tetraalkoxypropane, because esters of orthoformic acid are consumed, in the course of reaction, by decomposition as shown by the following formula:

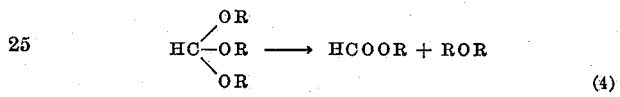

It is economically disadvantageous that we must use 2 or more than 2 mols of esters of orthoformic acid per mol of vinyl acetate in order to form the skeleton of malondialdehyde. Based upon the above supposition, we searched for a catalyst by which the reaction of the Formula 2 could be made more rapid and the reaction of the Formula 3 could be made slower. As the result of such studies made, we found that it was possible to react equimols of vinyl acetate with esters of orthoformic acid and, by addition reaction, to form 1.1.3-trialkoxy-3-acetoxypropane, and we thus established a process for the preparation of malondialdehyde derivatives which is economically advantageous.

It is an object of the present invention to prepare with industrial advantages from vinyl acetate and esters of orthoformic acid the derivatives of malondialdehyde shown by the general formula:

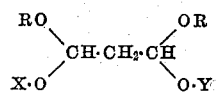

in which R is alkyl, X is acetyl or alkyl, and Y is acetyl or alkyl.

Another object of the invention is to provide a novel derivative of malondialdehyde, 1.1.3-trialkoxy-3-acetoxypropane, represented by the above general formula in which X is alkyl and Y is acetyl, and also a novel derivative of malondialdehyde, 1.3-dialkoxy-1.3-diacetoxypropane, represented by the above general formula in which both X and Y are acetyl.

Still another object of the invention is to prepare with industrial advantages 1.1.3.3-tetraalkoxypropane from any derivative or mixture of derivatives of malondialdehyde shown by the general formula:

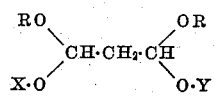

in which R is alkyl, X is acetyl or alkyl, and Y is acetyl, or from the mixture of such derivative or derivatives with 1.1.3.3-tetraalkoxypropane.

The first object is accomplished by reacting vinyl acetate with esters of orthoformic acid in the presence of "catalysts of fluorine-mercury system." The second object is accomplished by rectification under reduced pressure of the reaction mixture obtained by reacting vinyl acetate with esters of orthoformic acid in the presence of "catalysts of fluorine-mercury system." The last object is accomplished by reacting with alcohols, in the presence of acid reacting catalyst, any derivative or mixture of derivatives of malondialdehyde shown by the general formula:

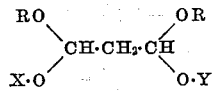

in which R is alkyl, X is acetyl or alkyl, and Y is acetyl, or mixture of such derivative or derivatives with 1.1.3.3-tetraalkoxypropane.

As described above, we studied the catalytic reaction in which the reaction of the Formula 2 would be accelerated, the reaction of the Formula 3 would be controlled, and the decomposition of esters of orthoformic acid themselves could be avoided. We found out that the reaction proceeded in the presence of "catalysts of fluorine-mercury system." Such "catalysts of fluorine-mercury system" include catalysts of mercurous or mercuric fluoride alone, or mixed catalysts of fluorine compounds and mercury compounds. The examples of fluorine compounds used as a component of mixed catalysts are: boron trifluoride; the complexes formed from boron trifluoride with alcohols, esters, ethers, aldehydes or carboxylic acids; hydrogen fluoride; and dioxyfluoboric acid. The examples of mercury compound which is the other component of mixed catalysts are: mercurous oxide, red or yellow mercuric oxide, mercurous nitrate, mercuric nitrate, mercurous phosphate, mercuric phosphate, mercurous acetate, and mercuric acetate. Needless to say, mercurous or mercuric fluoride can be used alone as catalyst.

When the above "catalyst of fluorine-mercury system" is added to, for example, methyl orthoformate and vinyl acetate in accordance with this invention, and when the mixture is stirred at a temperature of 0–50° C., the reaction progresses accompanied by the evolution of heat. The reaction is so rapid that efficient cooling is required to avoid vigorous or even violent boiling. After the reaction is completed, the reaction mixture is neutralized by adding anhydrous sodium carbonate, potassium carbonate or sodium alcoholate. The precipitates are then filtered off, and the filtrate is distilled under reduced pressure, whereby the mixture of derivatives of malondialdehyde is obtained.

In order to confirm the existence of the derivatives of malondialdehyde, small parts of low boiling product were distilled off from the above mixture, and then three fractions having the following properties were rectified under reduced pressure by means of a high efficiency column:

| | 1st fraction | 2nd fraction | 3rd fraction |
|---|---|---|---|
| Boiling point (° C./7-8 mm. Hg) | 58–60 | 76–77 | 95–98. |
| Specific gravity ($d_{20}^{20}$) | 0.9885 | 1.0590 | 1.1095. |
| Refractive index ($n_D^{20}$) | 1.4052 | 1.4144 | 1.4195. |
| Appearance | colourless transparent. | colourless transparent. | colourless transparent. |

It was easily confirmed that the first fraction was 1.1.3.3-tetramethoxypropane in view of the properties it had. The second fraction was obtained in larger quantities than the first and third fractions. The second fraction could easily be hydrolyzed with alkali or acid to form malondialdehyde. Also, 2-aminopyrimidine was formed by reacting the above fraction with guanidine or salts thereof. As shown in the following table, we confirmed that the second fraction was exactly 1.1.3-trimethoxy-3-acetoxypropane, a novel compound never reported in the literature, and of which we supposed the formation from the reaction mechanism:

| | 1.1.3-trimethoxy-3-acetoxypropane | |
|---|---|---|
| | theoretical value | experimental value |
| C (percent) | 49.98 | 49.80 |
| H (percent) | 8.39 | 8.06 |
| molecular refraction ($MR_D$) | 45.12 | 45.35 |
| methoxy radical (percent) | 48.44 | 47.56 |
| acetyl radical (percent) | 22.40 | 22.31 |
| molecular weight | 192.2 | 190.0 |
| specific gravity ($d_{20}^{20}$) | | 1.0590 |
| refractive index ($n_D^{20}$) | | 1.4144 |
| boiling point (° C./7-8 mm. Hg) | | 76–77 |

Further, the third fraction could easily be hydrolyzed with alkali or acid to form malondialdehyde. Also, 2-aminopyrimidine was formed by reacting the above fraction with guanidine or salts thereof. As shown in the table hereunder, we confirmed that the third fraction was dimethoxydiacetoxypropane, a novel compound never reported in the literature. The above dimethoxy-diacetoxypropane is supposed to have the structure of either 1.3-dimethoxy-1.3-diacetoxypropane or 1.1-dimethoxy-3.3-diacetoxypropane. Now, generally speaking,

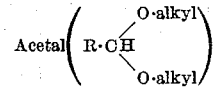

is stable to alkali (alkali in aqueous solution, hereinafter the same), and even acetal-acetal type compound, such as 1.1.3.3-tetraalkoxypropane, is stable to alkali. On the other hand,

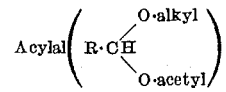

is highly unstable to alkali, and acetal-acylal type compound, such as 1.1.3-trialkoxy-3-acetoxypropane, is highly unstable to alkali. Generally,

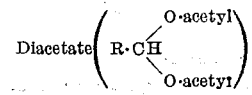

is slightly stable to alkali. Supposing that dimethoxydiacetoxypropane is 1.1-dimethoxy-3.3-diacetoxypropane, namely, acetal-diacetate type compound, it can be said from the above fact that such compound should at least be as stable as diacetate to alkali. Since dimethoxy-diacetoxypropane obtained by the method of the present invention is considerably unstable to alkali, it is clear that this compound must be considered as 1.3-dimethoxy-1.3-diacetoxypropane, i. e., acylalacylal type, and not as 1.1-dimethoxy-3.3-diacetoxypropane, i. e., acetal-diacetate type.

| | 1.3-dimethoxy-1.3-diacetoxypropane | |
|---|---|---|
| | theoretical value | experimental value |
| C (percent) | 49.1 | 48.7 |
| H (percent) | 7.37 | 7.17 |
| molecular refraction ($MR_D$) | 50.36 | 50.5 |
| methoxy radical (percent) | 28.2 | 27.3 |
| acetyl radical (percent) | 39.10 | 38.78 |
| molecular weight | 220 | 218 |
| specific gravity ($d_{20}^{20}$) | | 1.1095 |
| refractive index ($n_D^{20}$) | | 1.4195 |
| boiling point (° C./7-8 mm. Hg) | | 95–98 |

Instead of the above methyl orthoformate, we can use in the present invention ethyl orthoformate, propyl orthoformate, butyl orthoformate, dimethylethyl orthoformate, dimethylpropyl orthoformate and the like. The reaction progresses in the same manner, and there can be formed the derivatives of malondialdehyde as shown by the following general formula:

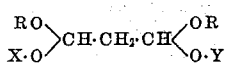

in which R is alkyl, X is acetyl or alkyl, and Y is acetyl or alkyl.

Namely, by using ethyl orthoformate, 1.1.3-triethoxy-3-acetoxypropane, 1.3-diethoxy-1.3-diacetoxypropane and 1.1.3.3-tetraethoxypropane are formed, and by using butyl orthoformate, 1.1.3-tributoxy-3-acetoxypropane, 1.3-dibutoxy-1.3-diacetoxypropane and 1.1.3.3-tetrabutoxypropane are formed.

As described above, it was made clear that 1.1.3-trialkoxy-3-acetoxypropane was mainly produced and 1.3-dialkoxy-1.3-diacetoxypropane and 1.1.3.3-tetraalkoxypropane were produced as by-products, when equimols of esters of orthoformic acid were reacted with vinyl acetate in the presence of "catalysts of fluorine-mercury system" in accordance with the present invention. The reaction is represented mainly by the following Formula 5, and by the Formulae 6 and 7 as side reactions, whereby the above three different derivatives of malondialdehyde are formed. In the case of equimol reaction, the side reaction of the Formula 6 is undesirable because orthoesters are excessively consumed.

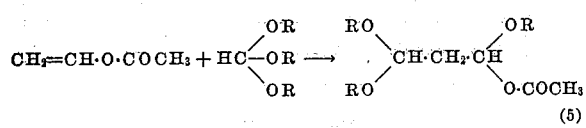

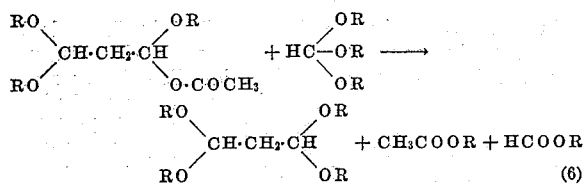

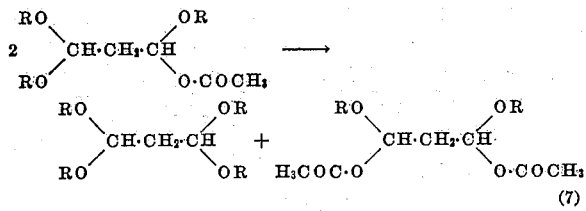

in which R is an alkyl radical.

In the present invention, it is necessary to use concurrently fluorine compound and mercury compound as "catalysts of fluorine-mercury system." By using fluorine compound alone, no reaction progresses, except when BF₃ or complexes thereof are used, in which case only a small quantity of 1.1.3.3-tetraalkoxypropane is formed; and on the other hand, by using mercury compound alone, no reaction progresses, except mercury fluoride, in which case the reaction proceeds as mentioned above.

The proportion of 1.1.3-trialkoxy-3-tetraalkoxypropane, 1.3-dialkoxy-1.3-diacetoxypropane and 1.1.3.3-tetraalkoxypropane, contained in the reaction products which are obtained by the present invention, depend upon the molar ratio of orthoesters to vinyl acetate; the kind and quantity of catalyst used, more especially the kind, the mixing rate and the quantity of fluorine compound and mercury compound used as mixed catalyst; and also the reaction temperature. This fact is worthwhile noticing in connection with the function and mechanism of the catalysts. The amount of orthoesters need not always be equimol to vinylacetate. In order to obtain a good result, a molar ratio of 0.5–1.5 mols, preferably 0.75–1.0 mol, to vinylacetate may be used. Although the amount of catalyst is not critical, it is preferable to use, for example in case BF₃–HgO is chosen as suitable catalyst, 0.001–0.02 molar ratio of BF₃ to orthoesters, and about 1.0–2.0 molar ratio of HgO to BF₃. The reaction temperature may depend upon the kind and composition of catalyst. However, a temperature within a comparatively large range can be chosen. Generally, a temperature of 0–50° C. gives a satisfactory result. While a temperature below 0° C. is operative, it is not practical to use such a low temperature because the reaction velocity is lowered down. At a temperature over 50° C., the side reactions of the Formulae 4, 6 and 7 increase. Especially, orthoesters decompose and are consumed by the Formulae 4 and 6. Therefore, such temperature is not suited for obtaining a good yield of derivatives of malondialdehyde having the malondialdehyde skeleton.

The preparation of 2-aminopyrimidine, which is useful as intermediate of medicine, can be obtained by reacting, with guanidine or salts thereof, the derivatives of malondialdehyde which are obtained by the present invention and represented by the general formula:

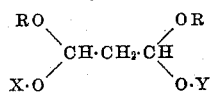

in which R is alkyl, X is acetyl or alkyl, and Y is acetyl or alkyl. Namely, 1.1.3-trialkoxy-3-acetoxypropane, 1.3-dialkoxy-1.3-diacetoxypropane, mixture of one of the above with 1.1.3.3-tetraalkoxypropane, and mixture of the above two with 1.1.3.3-tetraalkoxypropane can form 2-aminopyrimidine by reacting with guanidine or salts thereof.

Also, 1.1.3.3-tetraalkoxypropane can almost quantitatively be obtained by the reaction, with alcohols in the presence of acid reacting catalyst such as borontrifluoride, complexes thereof with ethers, alcohols, esters, aldehydes, carboxylic acids and the like, aluminium chloride, ferric chloride, stannous chloride, zinc chloride and hydrogen chloride, of any of the derivatives of malondialdehyde represented by the general formula:

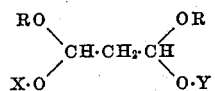

in which R is alkyl, X is acetyl or alkyl, and Y is acetyl. These reactions can be represented by the following formulae:

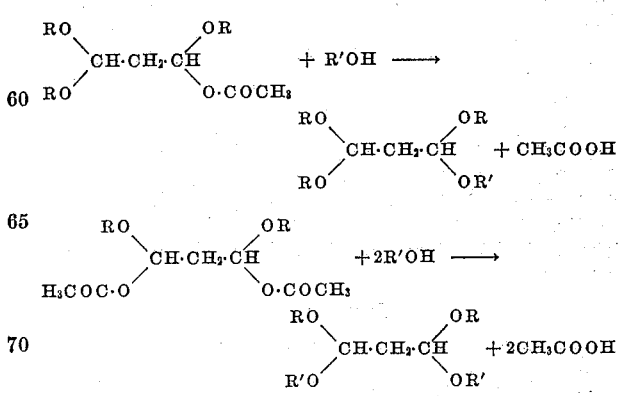

in which R and R' are the same or different alkyl radicals.

It is certain that the same reaction can likewise be performed with the mixture of 1.1.3-trialkoxy-3-acetoxypropane and/or 1.3-dialkoxy-1.3-diacetoxypropane with 1.1.3.3-tetraalkoxypropane. In case vinyl acetate and orthoesters of formic acid are reacted in the presence of "catalyst of fluorine-mercury system" the reaction mixture obtained contains therein the used catalyst, and therefore, 1.1.3.3-tetraalkoxypropane can be obtained by reacting with alcohols without adding any acid reacting catalyst.

According to the present invention, three different kinds of derivatives of malondialdehyde are formed at the same time, and 1.1.3-trialkoxy-3-acetoxypropane, the main reaction product, is only obtained in about 60% of the theoretical yield to esters of orthoformic acid. However, in view of —CH·CH$_2$·CH—, malondialdehyde skeleton which is necessary for the formation of, for example, 2-aminopyrimidine, the yield of 1.3-dialkoxy-1.3-diacetoxypropane and of 1.1.3.3-tetraalkoxypropane may be included in that of 1.1.3-trialkoxy-3-acetoxypropane. By this way, the total yield of all the derivatives of malondialdehyde produced to esters of orthoformic acid becomes 80–90% of the theoretical under the most favourable conditions. It is clear that such percentage is extremely advantageous economically.

We shall now give a detailed description of the invention by examples. It must be noted, however, that such examples are given by way of illustration and not by way of limitation of the scope of the invention. The "parts" shown in examples are "parts by weight."

*Example I*

In a reactor equipped with stirrer, thermometer and reflux condenser, 106 parts of methyl orthoformate, 4 parts of red mercuric oxide and 2.5 parts of 60% hydrofluoric acid were charged. To this mixture, 86 parts of vinyl acetate were added under stirring over a period of five minutes while the temperature was maintained at below 30° C. by means of an ice bath. The reaction mixture was stirred for ten hours, the temperature being maintained at 30° C. Then, by adding 10 parts of anhydrous sodium carbonate, the reaction mixture was neutralized and filtered. The filtrate was fractionated under reduced pressure by means of a high efficiency column, and by distilling off the lower boiling fraction therefrom, there were obtained first, 32.8 parts of 1.1.3.3-tetramethoxypropane (B. P. 58–61° C./7–8 mm. Hg), secondly, 66.2 parts of 1.1.3-trimethoxy-3-acetoxypropane (B. P. 76–80° C./7–8 mm. Hg), and finally 28.6 parts of 1.3-dimethoxy-1.3-diacetoxypropane (B. P. 95–100° C./7–8 mm. Hg). The total yield of malondialdehyde derivatives to orthoester was 67.7%.

*Example II*

In a reactor similar to that described in Example I, 106 parts of methyl orthoformate, 5 parts of mercuric nitrate, and 2 parts of borontrifluoride diethylether complex were charged. To this mixture, 94.5 parts of vinyl acetate were added under stirring over a period of five minutes while the temperature was maintained at below 20° C. by means of an ice bath. The reaction mixture was stirred for six hours at the temperature of 20° C. and for four hours at the temperature of 30° C. Thereafter, the process of Example I was followed, and there were obtained first, 27.4 parts of 1.1.3.3-tetramethoxypropane, secondly, 91.3 parts of 1.1.3-trimethoxy-3-acetoxypropane, and finally, 34.2 parts of 1.3-dimethoxy-1.3-diacetoxypropane. The total yield of malondialdehyde derivatives to orthoester was 79.9%.

*Example III*

In a reactor similar to that described in Example I, 106 parts of methyl orthoformate, 3.5 parts of yellow mercuric oxide and 2 parts of borontrifluoride diethylether complex were charged. To this mixture, 86 parts of vinyl acetate and 100 parts of benzene were added. The reaction was performed for 6 hours at the temperature of 35° C. Thereafter, the process of Example I was followed, and there were obtained first, 31.1 parts of 1.1.3.3-tetramethoxypropane, secondly, 83.3 parts of 1.1.3-trimethoxy-3-acetoxypropane, and finally 20.3 parts of 1.3-dimethoxy-1.3-diacetoxypropane. The total yield of malondialdehyde derivatives to orthoester was 71.6%.

*Example IV*

In a reactor similar to that described in Example I, 148 parts of ethyl orthoformate, 5 parts of mercuric acetate and 2 parts of borontrifluoride diethylether complex were charged. To this mixture, 86 parts of vinyl acetate were added under stirring over a period of five minutes while the temperature was maintained at below 20° C. by means of an ice bath. The reaction mixture was stirred for 24 hours at the temperature of 20° C. Thereafter, the process of Example I was followed, and there were obtained first, 34.5 parts of tetraethoxypropane, secondly, 101.8 parts of 1.1.3-triethoxy-3-acetoxypropane, and finally 20.3 parts of 1.3-diethoxy-1.3-diacetoxypropane. The total yield of malondialdehyde derivatives to orthoester was 67.3%. The result of the experiment was as follows:

| | 1.1.3-triethoxy-3-acetoxypropane | 1.3-diethoxy-1.3-diacetoxypropane |
|---|---|---|
| boiling point (° C./3.5 mm. Hg) | 80–82.5 | 92–95 |
| refractive index ($n_D^{20}$) | 1.4159 | 1.4225 |
| specific gravity ($D_{20}^{20}$) | 0.987 | 1.052 |
| molecular refraction (theoretical value) | 59.54 (59.58) | 60.00 (59.59) |
| elementary analysis: | | |
| C, percent (theoretical value) | 56.49 (56.40) | 53.40 (53.21) |
| H, percent (theoretical value) | 9.58 (9.47) | 8.10 (8.12) |

*Example V*

In a reactor similar to that described in Example I, 106 parts of methyl orthoformate, 3 parts of mercurous nitrate and 1 part of borontrifluoride diethylether complex were charged. To this mixture, 86 parts of vinyl acetate were added under stirring over a period of five minutes while the temperature was maintained at below 15° C. by means of an ice bath. The reaction mixture was stirred for 6 hours, the temperature being gradually raised from 15° C. to 50° C. Thereafter, the process of Example I was followed, and there were obtained first, 28.0 parts of 1.1.3.3-tetramethoxypropane, secondly, 56.6 parts of 1.1.3-trimethoxy-3-acetoxypropane, and finally 22.0 parts of 1.3-dimethoxy-1.3-diacetoxypropane. The total yield of malondialdehyde derivatives to orthoester was 56.6%.

*Example VI*

In a reactor similar to that described in Example I, 106 parts of methyl orthoformate, 5 parts of red mercuric oxide and 2.5 parts of borontrifluoride diethylether complex were charged. To this mixture, 99 parts of vinyl acetate were added under stirring over a period of five minutes while the temperature was maintained at below 30° C. by means of an ice bath. The reaction mixture was stirred for 8 hours at the temperature of 30° C. Thereafter, the process of Example I was followed, and there were obtained first, 29.8 parts of 1.1.3.3-tetramethoxypropane, secondly, 91.9 parts of 1.1.3-trimethoxy-3-acetoxypropane, and finally, 41.0 parts of 1.3-dimethoxy-1.3-diacetoxypropane. The total yield of malondialdehyde derivatives to orthoester was 84.7%.

*Example VII*

In a reactor similar to that described in Example I, 106 parts of methyl orthoformate, and 6.35 parts of mercuric fluoride dihydrate were charged. To this mixture, 104 parts of vinyl acetate were added under stirring over a period of five minutes while the temperature was maintained at below 30° C. by means of an ice bath. The reaction mixture was stirred for 8 hours at the temperature of 30° C. Thereafter, the process of Example I was followed, and there were obtained first, 47.1 parts of 1.1.3.3-tetramethoxypropane, secondly 72.1 parts of 1.1.3-trimethoxy-3-acetoxypropane, and finally 43.0 parts of 1.3-dimethoxy-1,3-diacetoxypropane. The total yield of malondialdehyde derivatives to orthoester was 85.7%.

*Example VIII*

In a reactor similar to that described in Example I, 106 parts of methyl orthoformate, and 5.5 parts of mercurous fluoride were charged. To this mixture, 104 parts of vinyl acetate were added under stirring over a period of five minutes while the temperature was maintained at below 30° C. by means of an ice bath. The reaction mixture was stirred for 8 hours at the temperature of 30° C. Thereafter, the process of Example I was followed, and there were obtained first, 23.4 parts of 1.1.3.3-tetramethoxypropane, secondly, 87.1 parts of 1.1.3-trimethoxy-3-acetoxypropane, and finally, 67.0 parts of 1.3-dimethoxy-1.3-diacetoxypropane. The total yield of malondialdehyde derivatives to orthoester was 90.0%.

*Example IX*

In a reactor similar to that described in Example I, 106 parts of methyl orthoformate, 5 parts of red mercuric oxide, and 2 parts of borontrifluoride methylalcohol complex [$BF_3(CH_3OH)_{1.85}$] were charged. To this mixture, 104 parts of vinyl acetate were added under stirring over a period of five minutes while the temperature was maintained at below 30° C. by means of an ice bath. The reaction mixture was stirred for 8 hours at the temperature of 30° C. Thereafter, the process of Example I was followed, and there were obtained first, 43.1 parts of 1.1.3.3-tetramethoxypropane, secondly, 83.4 parts of 1.1.3-trimethoxy-3-acetoxypropane, and finally, 43.8 parts of 1.3-dimethoxy-1.3-diacetoxypropane. The total yield of malondialdehyde derivatives to orthoester was 89.6%.

*Example X*

In a reactor similar to that described in Example I, 106 parts of methyl orthoformate, 2.5 parts of mercurous oxide, and 2 parts of borontrifluoride methylalcohol complex [$BF_3(CH_3OH)_{1.85}$] were charged. To this mixture, 104 parts of vinyl acetate were added under stirring over a period of five minutes while the temperature was maintained at below 30° C. by means of an ice bath. The reaction mixture was stirred for 8 hours at the temperature of 30° C. Thereafter, the process of Example I was followed, and there were obtained first, 32.8 parts of 1.1.3.3-tetramethoxypropane, secondly, 59.8 parts of 1.1.3-trimethoxy-3-acetoxypropane, and finally 32.0 parts of 1.3-trimethoxy-1.3-diacetoxypropane. The total yield of malondialdehyde derivatives to orthoester was 65.6%.

*Example XI*

To 96 parts of 1.1.3-trimethoxy-3-acetoxypropane having the boiling point of 76–77° C./7 mm. Hg, 32 parts of methanol were added. To the mixture, 1 part of borontrifluoride diethylether complex was added, and the reaction was performed for 2 hours at the temperature of 30° C. Since the reaction was exothermic, the temperature was maintained by means of an ice bath. On completion of reaction, the mixture was neutralized by adding anhydrous sodium carbonate thereto, and the precipitates were filtered off, and washed with methanol. The above filtrate was distilled under reduced pressure to obtain 80.4 parts of 1.1.3.3-tetramethoxypropane boiling at 77–78° C./20 mm. Hg. The yield was 98%.

*Example XII*

To 110 parts of 1.3-dimethoxy-1.3-diacetoxypropane (purity 97%) having the boiling point of 105–107° C./10 mm. Hg, 64 parts of methanol were added. The reaction was performed for 2 hours under stirring at the temperature of 30° C., hydrogen chloride being led into the mixture. Thereafter, the process of Example XI was followed, and 77.2 parts of 1.1.3.3-tetramethoxypropane boiling at 77–78° C./20 mm. Hg were obtained. The yield was 97%.

*Example XIII*

To 58.5 parts of 1.1.3-triethoxy-3-acetoxypropane having the boiling point of 101–102° C./6–7 mm. Hg, 20 parts of ethanol were added. The reaction was performed for 3 hours under stirring at the temperature of 50° C., 2 parts of anhydrous ferric chloride being added to the mixture. Thereafter, the process of Example XI was followed, and 53.6 parts of 1.1.3.3-tetraethoxypropane boiling at 90–92° C./10 mm. Hg were obtained. The yield was 97.4%.

*Example XIV*

To 58.5 parts of 1.1.3-triethoxy-3-acetoxypropane having the boiling point of 101–102° C./6–7 mm. Hg, 25 parts of methanol were added. The reaction was performed for 2 hours under stirring, at the temperature of 30° C., hydrogen chloride being led into the mixture. Thereafter, the process of Example XI was followed, and 49.2 parts of 1.1.3-triethoxy-3-methoxypropane boiling at 82–86° C./10 mm. Hg were obtained. The yield was 95.4%.

*Example XV*

106 parts of methyl orthoformate and 86 parts of vinyl acetate were reacted in the presence of mixed catalyst of borontrifluoride methanol complex and mercuric oxide, and 195 parts of the reaction mixture were obtained. In 110 parts of said reaction mixture, 14.9 parts of 1.1.3.3-tetramethoxypropane, 45.9 parts of 1.1.3-trimethoxy-3-acetoxypropane and 20.5 parts of 1.3-dimethoxy-1.3-diacetoxypropane were obtained. To 110 parts of the above mixture, 35 parts of methanol were gradually added over a period of 10 minutes, and the mixture was kept for 2 hours under stirring at the temperature of 30° C. The process of Example XI was followed, and 67.6 parts of 1.1.3.3-tetramethoxypropane boiling at 77–78° C./20 mm. Hg were obtained. The yield was 97%.

We claim:

1. The method for preparing a mixture of malondialdehyde derivatives having, as main component, 1.1.3-trialkoxy-3-acetoxypropane, and having, as other components, 1.3-dialkoxy-1.3-diacetoxypropane and 1.1.3.3-tetraalkoxypropane, all the alkoxy groups of said compounds being lower alkoxy, which comprises reacting vinylacetate with esters of orthoformic acid in the molar ratio of 0.5–1.5 to said vinylacetate, in the presence of a catalyst selected from the group consisting of mercury fluoride and combination catalyst of mercury catalyst and acidic fluoride catalyst, the said esters of orthoformic acid being selected from the group consisting of methyl orthoformate, ethyl orthoformate, propyl orthoformate, butyl orthoformate, dimethylethyl orthoformate and dimethylpropyl orthoformate, the said mercury catalyst, one component of the combination catalyst, being selected from the group consisting of mercurous oxide, mercuric oxide, mercurous nitrate, mercuric nitrate, mercurous phosphate, mercuric phosphate, mercurous acetate and mercuric acetate, and the said acidic fluorine catalyst, the other component of said combination catalyst, being selected from the group consisting of boron trifluoride, boron trifluoride complexes, hydrogen fluoride and dioxyfluoboric acid.

2. The method as defined in claim 1, in which 0.75–1.0 mol of esters of orthoformic acid is used per mol of vinylacetate.

3. The method as defined in claim 1, in which the reaction mixture is fractionally distilled to recover 1.1.3-trialkoxy-3-acetoxypropane having lower alkoxy groups.

4. The method as defined in claim 1, in which the reaction mixture is fractionally distilled to recover 1.3-dialkoxy-1.3-diacetoxypropane, the alkoxy groups being lower alkoxy.

5. 1.1.3-trialkoxy-3-acetoxypropane, the alkoxy groups being lower alkoxy.

6. 1.3 - dialkoxy - 1.3 - diacetoxypropane, the alkoxy groups being lower alkoxy.

References Cited in the file of this patent

UNITED STATES PATENTS

| | | |
|---|---|---|
| 2,446,171 | Croxall et al. | Aug. 3, 1948 |
| 2,459,076 | Hultquist | Jan. 11, 1949 |
| 2,556,312 | Young | June 12, 1951 |